United States Patent [19]
Rohweder et al.

[11] 3,982,384
[45] Sept. 28, 1976

[54] ROW CROP HARVESTING HEADER

[75] Inventors: Glen Willard Rohweder, Moline, Ill.;
Edward John Hengen, Bettendorf, Iowa

[73] Assignee: Deere & Company, Moline, Ill.

[22] Filed: Feb. 21, 1975

[21] Appl. No.: 551,526

[52] U.S. Cl. .................................. 56/106; 56/14.3
[51] Int. Cl.² .......................................... A01D 45/02
[58] Field of Search ............ 56/13.9, 28, 14.3, 14.4, 56/14.5, 14.6, 94, 98, 102, 103, 106, 108, 292, 119, 14.1, 14.2

[56] References Cited
UNITED STATES PATENTS

| | | | |
|---|---|---|---|
| 2,534,481 | 12/1950 | Spraker | 56/119 |
| 3,520,121 | 7/1970 | Ashton et al. | 56/106 |
| 3,645,075 | 2/1972 | Kappelman | 56/28 |
| 3,808,783 | 5/1974 | Sutherland et al. | 56/106 |

*Primary Examiner*—Russell R. Kinsey

[57] ABSTRACT

A self-propelled combine has a forwardly extending housing with a row crop header mounted on the front end of the housing. The header has a transversely elongated frame, a transversely elongated floor, a transverse auger immediately above the floor for converging the crop laterally along the floor and discharging it rearwardly into the combine crop feeding housing, and a plurality of transversely spaced row units mounted on and extending forwardly from the header frame, each row unit being adapted to sever the crop standing in a row as the machine advances and discharge the crop rearwardly onto the header floor forwardly of and below the auger. Each row unit has a forwardly and downwardly inclined frame, with a top surface and a central fore and aft trough, which forms the bottom of a fore and aft passageway. A pair of endless flexible conveyor members are mounted on each row unit frame adjacent the top surface and have rearwardly moving, intermeshing, inner runs on opposite sides of the passageway, a rotary cutting device being provided on the underside of the row unit frame adjacent the forward ends of the conveyor members for severing the crop from the field. Each row unit is independently vertically adjustable, and a hood is mounted on each pair of adjacent row units and covers the area between the passageways of the adjacent row units, a forwardly converging divider member extending forwardly from each hood and having a forward divider point that moves between the adjacent rows as the machine advances. The row units are laterally adjustable to accommodate different row spacings and means are provided for selectively locking the row units rigidly to the header frame, the individual row units normally being independently floatable and partially supported on the ground through skid shoes that are tiltable about a fore and aft axis.

38 Claims, 10 Drawing Figures

ROW CROP HARVESTING HEADER

BACKGROUND OF THE INVENTION

This invention relates to a harvesting header for a combine or the like and more particularly to a multi-row, row crop header having particular utility for harvesting soybeans or the like.

It is known to provide row crop harvesting headers having a plurality of independent row units, wherein each row unit includes a fore and aft passageway adapted to receive the plants growing in a single row as the machine advances. It is further known to provide such row units with a pair of endless flexible gathering elements having opposite rearwardly moving inner runs that grasp the crop and move it rearwardly along the passageway, a cutting device being provided adjacent the forward end of the passageway for severing the crop from the field. Such a row unit is shown in U.S. Pat. No. 3,808,783, which is also assigned to the assignee herein.

SUMMARY OF THE INVENTION

The present invention provides an improved row unit header of the above general type, such as shown in said U.S. Pat. No. 3,808,783.

An important feature of the present invention resides in the provision for independent vertical floating adjustment of the individual row units on the header frame and the further provision of a locking device for each row unit for selectively locking out or limiting the independent vertical floating adjustment of the individual row units, so that the row units are rigidly connected to the header frame.

Another feature of the invention resides in the provision of hoods overlying the space between the adjacent row units to provide an attractive appearance for the header and to prevent the loss of material between adjacent units. Still further, means are provided for mounting the hoods on the adjacent row structures to accommodate the independent vertical adjustment of their respective row units. Also, the hoods are provided with opposite edges that partly form the edges of the row unit passageways and rear walls that function as strippers for the row unit gathering members or conveyors.

Another feature of the invention resides in the provision of a fore and aft trough below the passageway of each row unit, whereby the severed butt ends of the plants move upwardly and rearwardly in the trough, sweeping any shattered grain or the like that collects on the row unit upwardly and rearwardly along the trough to the auger.

Another feature of the invention resides in the relationship between the discharge end of the row unit conveyors and the auger that reduces the loss of loose grain from the platform.

Also according to the invention there is provided an improved means for adjusting the tension in the endless flexible gathering elements or conveyor members, and also improved means are provided for driving the rotary knife on each row unit.

Another feature of the invention resides in the provision of improved mounting for the skid shoes of each row unit, and more specifically in the provision for oscillation of the skid shoes on the row unit about a fore and aft axis.

Still another feature of the invention resides in the provision of improved divider members extending forwardly from each hood between the adjacent row units. More specifically, improved means are provided for mounting the divider members on the adjacent row units, so that the divider members are maintained in a generally constant attitude about a transverse pivot axis regardless of the vertical position of the row unit, the improved mounting also accommodating relative vertical movement between the adjacent row units on which the divider members are mounted.

DESCRIPTION OF THE PREFERRED EMBODIMENT

Figure 1:
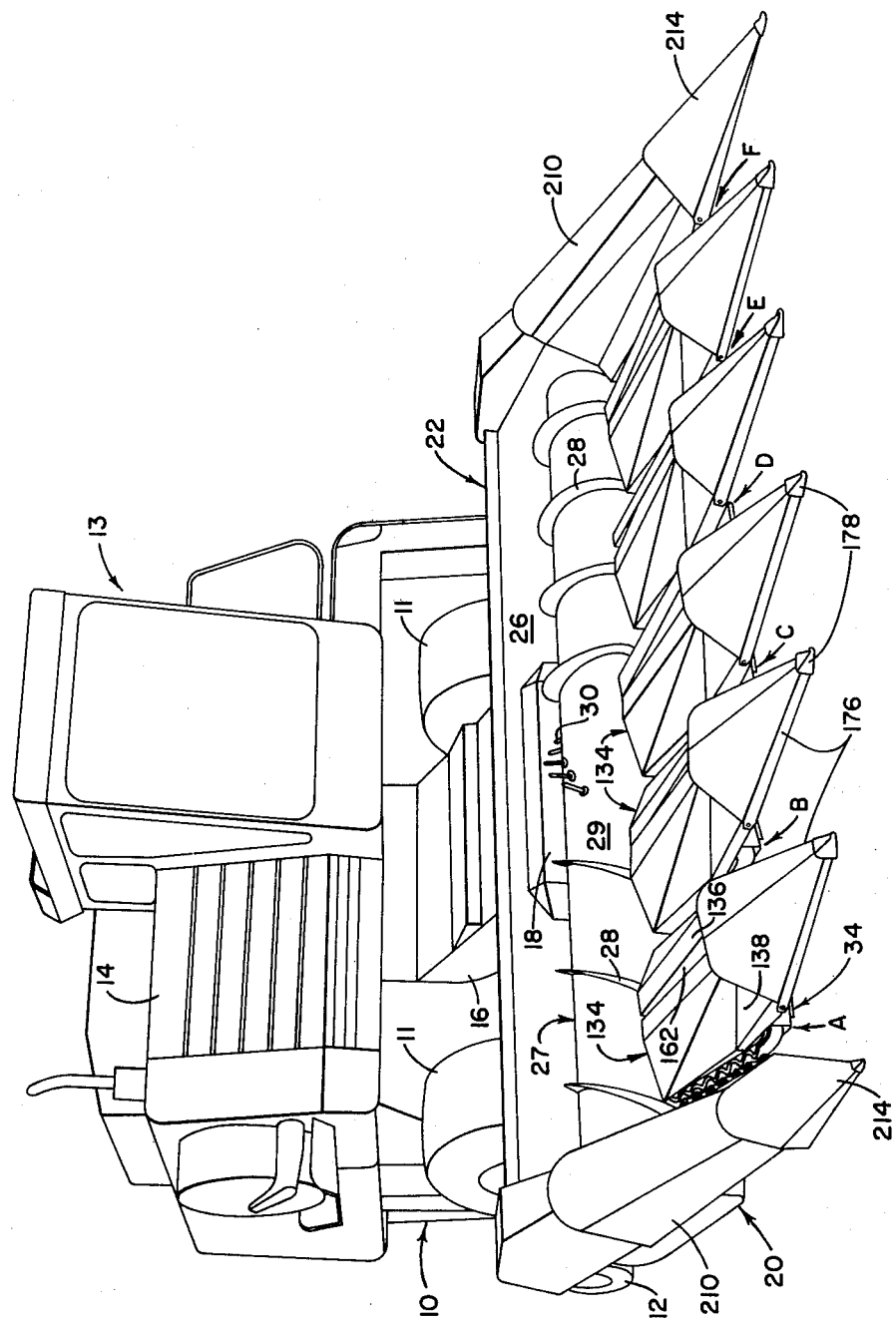
FIG. 1 is a right front perspective view of a self-propelled combined with the improved row crop header embodying the invention being mounted thereon.

A self-propelled combine has a means separator body, indicator generally by the numeral 10, the body being supported on a pair of forward drive wheels 11 and steerable rear wheels 12, only a portion of one rear wheel being shown. As is conventional, the combine has a forward elevated operator's station 13, and an internal combustion engine (not shown) is mounted in a forward engine enclosure 14 adjacent to the operator's station. A crop feeder housing 16 extends forwardly from the body 10 below the operator's station 13 and engine enclosure 14 and has a forward crop inlet 18.

Figure 2:
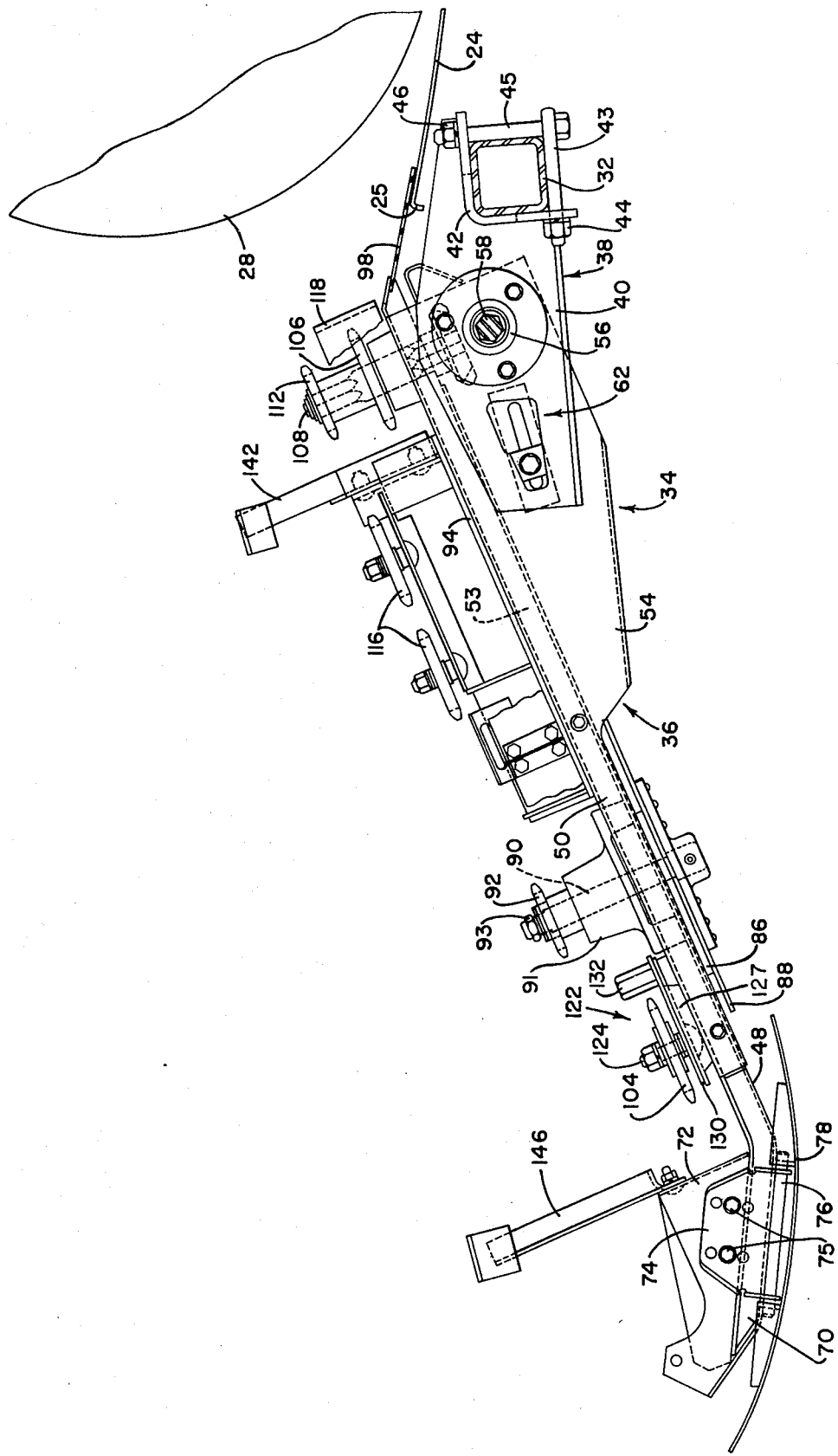
FIG. 2 is a side elevation view of the frame of one of the header row units mounted on the header frame, the hoods and dividers between adjacent row units being omitted.

The invention is embodied in an improved crop header, indicated generally by the numeral 20, the header being mounted on the forward end of the feeder housing 16 and being adapted to remove the crop from the field and deliver it rearwardly through the feeder housing inlet 18. The header includes a rigid transversely elongated frame 22 with a generally horizontal floor 24 mounted on the frame and substantially spanning the width of the header. The floor 24 has a forward edge 25 and the forward portion of the floor is inclined slightly downwardly to the rear, as best seen in FIG. 2, while the rearward portion of the floor curves upwardly to merge into an upright rear wall 26 that spans the width of the header and has a central crop discharge opening that registers with the feeder housing inlet 18. A transverse, crop converging auger 27 spans the width of the header immediately above the floor and immediately in front of the rear wall, the upwardly and forwardly concave juncture of the rear wall and the floor being closely adjacent to the periphery of the auger. The auger has oppositely wound flights 28 at its opposite ends, the flights being wound around the auger tube 29 which serve to move the crop to the middle of the header, where a feeding mechanism 30 mounted in the center of the auger tube moves the crop material rearwardly through the feeder housing inlet 18, all of the above representing more or less conventional combine platform construction.

The header frame 22 includes a transverse beam 32 that spans the width of the header and is disposed immediately below the forward edge 25 of the floor 24, and a plurality of row units 34 are mounted on and extend forwardly from the beam 32. Each row unit is substantially identical, and therefore only a single row unit will be described in detail, the row units being spaced so that each row unit receives a row of row-planted crop material as the machine advances, removes the crop from the field and delivers it rearwardly onto the header floor 24 immediately in front of and below the auger 27. The header illustrated herein has six row units 34, respectively identified by the letters, A, B, C, D, E, and F in FIG. 1, to simultaneously harvest six rows of crop material as the machine advances. As is well known, a greater or lesser number of row units can be provided, the header size conventionally being designed to match the capacity of the combine.

Each row unit includes a frame 36 extending forwardly and downwardly from the header frame beam 32 and mounted on the beam by mounting means, indicated generally by the numeral 38, that permits lateral adjustment of the row units along the beam 32 and also permits selective vertical swinging movement of the row unit relative to the header frame. Each mounting means 38 includes a pair of transversely spaced forwardly extending arms 40 having inverted L-shaped flanges 42 at their rearward ends that seat against the top and the front of the beam 32. An eyebolt 43 extends rearwardly through a bore at the bottom of each flange 42 and seats against the bottom of the beam 32, the eyebolt being secured to the flange by means of a nut 44. A bolt 45 extends upwardly through the eyebolt and through a vertical bore at the top of the flange 42 and is secured therein by a nut 46. As is apparent, the bolt 45 extends along the rear side of the beam 32 and by tightening the nuts 44 and 46, the arms 40 are rigidly clamped to the beam 32.

Figure 9:
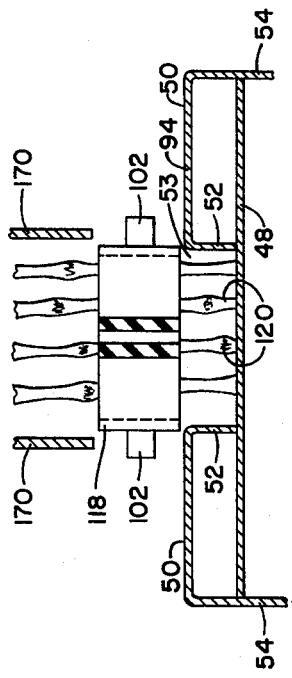
FIG. 9 is a schematic vertical transverse section through one of the row units rearwardly of the cutting apparatus, showing the stalks of the crop after they have been severed from the field and engaged by the gathering elements.

Each row unit includes a generally downwardly and forwardly inclined frame plate 48, and a pair of inverted U-shaped members 50 are welded on top of the plate 48. The U-shaped members 50 are transversely spaced and run in a fore and aft direction, the opposite inner legs 52 forming the opposite sides of a fore and aft trough 53 on top of the frame plate 48. The rearward portion of the outer legs of the U-shaped members 50 are provided with depending integral flanges 54 that extend below the frame plate, as best shown in FIGS. 2 and 9, and the outer flanges 54 are respectively disposed adjacent to and between the pair of arms 40 that form part of the mounting means 38. A pair of annular pivots 56 respectively connect the outer flanges 54 on each row unit frame to the arms 40 to permit vertical swinging movement of the row unit frame relative to the header frame.

A transverse drive shaft 58 extends through and is journaled in the annular pivots and is provided with adjustable sleeves 60 between the adjacent row units to accommodate different spacing between the respective row units. The provision for lateral adjustment of the row units and for adjustment of the drive shaft to accommodate the lateral adjustment as described above is well known. As is also well known, the drive shaft can either extend the entire width of the header, which is usually the case with narrower headers, or the drive shaft can extend inwardly from both sides of the header, which is generally the case when wider headers, such as illustrated herein, are utilized. In the former case, the drive shaft is driven from the left side of the header by a drive system that includes a drive shaft on the rear side of the header, which in turn is connected to a drive on the left side of the feeder housing in the well known manner, the drive system for driving from both sides of the header also being well known.

Figure 8:
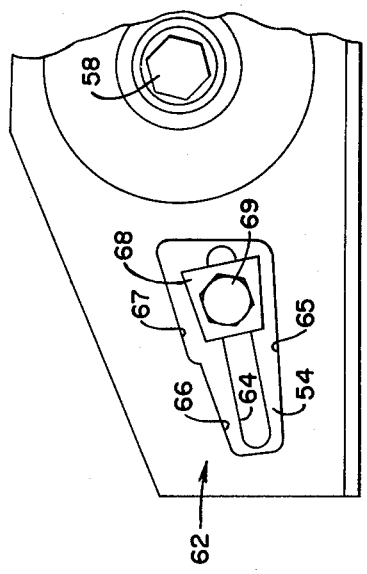
FIG. 8 is an enlarged side elevation view of the locking device between a row unit and the header frame.

A locking device 62 is provided between each arm 40 and the adjacent flange 54 of the row unit frame to permit selective rigid locking of the row units to the header frame or to permit independent vertical floating adjustment of the respective row units within a limited degree. Each locking device includes a generally fore and aft slot 64 in the flange 54 and a corresponding adjacent slot 65 in the arm 40. The slot 65 is wider than the slot 64 and has a narrowed front portion 66 and a wide rear portion 67. A block 68 is disposed in the slot 65 and is connected to the flange 54 by means of a nut and bolt type fastener 69 that extends through the slot 64 and is slidable therein when the fastener is loosened. The vertical dimensions of the block 68 substantially conform to the vertical height of the forward or narrow portion 66 of the slot 65, and when the block is moved into the narrow slot portion 66, as shown in FIG. 2, the row unit frame 36 is prevented from moving relative to the arms 40, so that the row unit frame is rigid with the header frame. When the block 68 is adjusted rearwardly along the slot 64, so that it is disposed in the wider portion 67 of the arm slot, as shown in FIG. 8, the header frame is free to move upwardly about the axis of the pivots 56 until the top of the block engages the top of the slot and conversely is free to move downwardly until the bottom of the block engages the bottom of the slot.

The frame plate 48 includes a pair of forwardly diverging arm portions 70, which are angled relative to the inclined plate and extend in a generally horizontal direction. A pair of upright support members 72 are mounted adjacent the forward ends on the respective arm portions 70, and a pair of brackets 74 respectively depend from the support members 72 and are removably connected thereto by fasteners 75. As is apparent from FIG. 2, alternate holes are provided in the brackets 74 to permit vertical adjustment of the brackets relative to the frame. Each bracket carries a fore and aft pivot 76, and a skid shoe 78 is swingably mounted on each pivot 76, the pivotal mounting of the skid shoe 78 permitting the skid shoe to oscillate about a fore and aft axis so that it is free to follow the contour of the ground. The above is especially advantageous in a row crop harvester, since the skids ride on the ground on opposite sides of the row, which is frequently ridged to some degree, the oscillation of the skid shoe about the fore and aft axis permitting the skid shoe to ride on the side of the ridged row without digging into the ground.

The skid shoe only rides along the ground when the locking device 62 is in its unlocked position, wherein it permits vertical floating movement of the row unit along the ground. An upright mast 82 is mounted on and extends upwardly and forwardly from the beam 32 for each row unit, the means for mounting the mast 82 on the beam being substantially identical to the means for mounting the arms 40 on the beam. A fore and aft tension spring 84 extends between each mast 82 and one of the support members 72 of each row unit, the spring being connected to the mast 82 by means of an adjusting bolt that permits adjustment of the spring tension in the well known manner. As is apparent, the spring 84 counterbalances at least part of the weight of the row unit and is adjusted so that only the desired amount of weight is supported on the skid shoe 78, whereby the row unit readily swings upwardly to clear an obstruction.

A flat, straight stationary knife 86 is mounted on the bottom of the frame plate 48 at the rearward end of the gap between the diverging arm portions 70 of the plate, the cutting edge of the stationary knife being on the leading edge of the knife which is inclined relative to the direction of machine travel. A rotary, star type knife 88 is mounted below the stationary knife 86 and the cutting edges of the rotary knife register with the stationary knife as the rotary knife rotates. The machine is driven along the field so that the arm portions 70 of the plate straddle the crop row, whereby the stalks of the crop move rearwardly between the arms and are severed as they engage the stationary knife blade. The stationary and rotary knives are mounted on the underside of the frame relatively close to the ground, so that the stalk of the crop is severed close to the ground. The rotary knife 88 is mounted on a generally upright shaft 90, that extends upwardly through the frame plate and through a bearing box or support 91 mounted on top of the frame. A chain drive sprocket 92 is provided on the upper end of the shaft above the bearing box, and the upper end of the shaft is threaded and secured in the bearing box by a nut 93. As is apparent, the rotary knife can be removed or adjusted from on top of the machine by simply rotating the nut, and when the nut is removed, the shaft 90 and the knife 88 mounted thereon drops from the bottom of the row unit.

Figure 3:
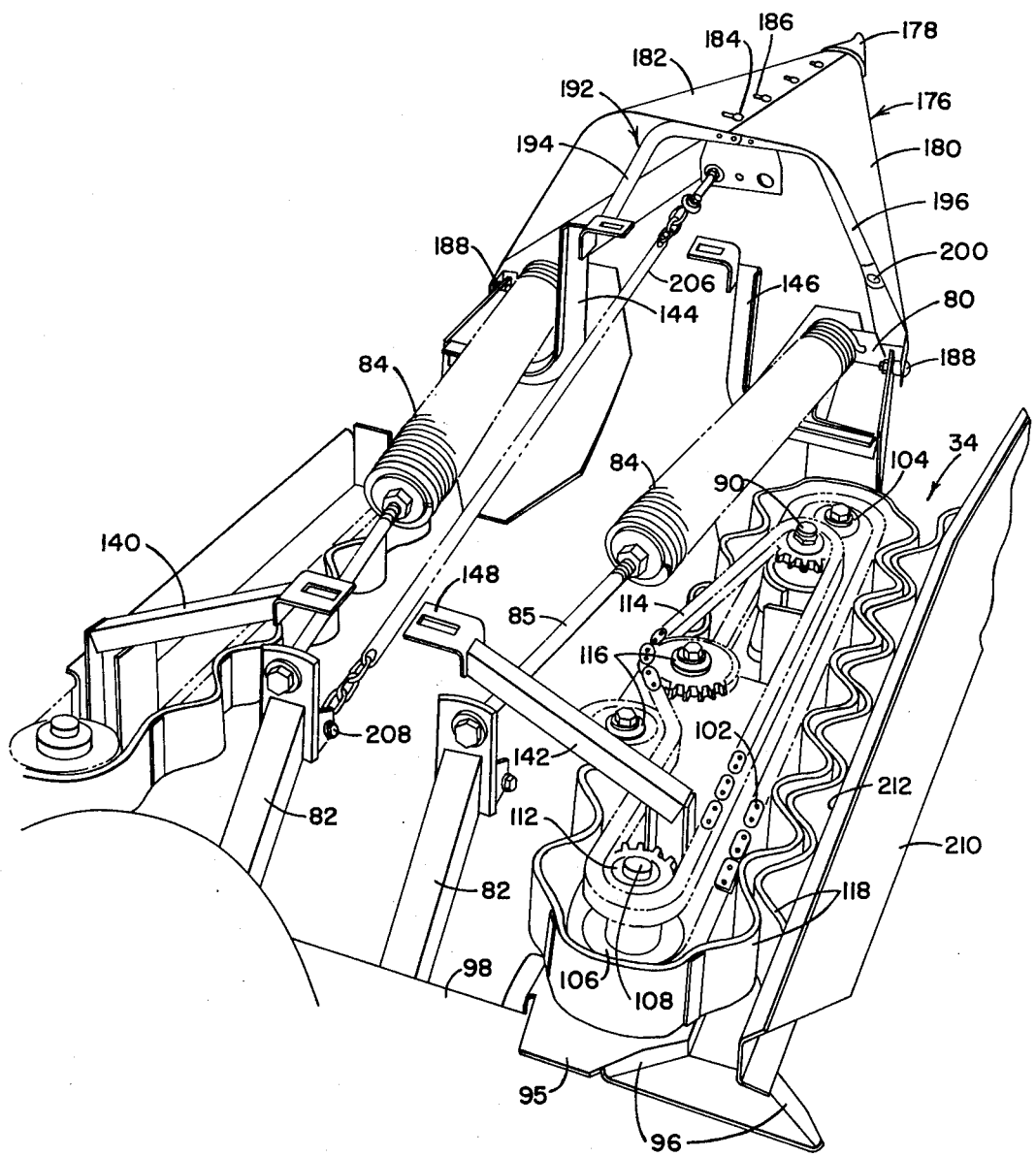
FIG. 3 is a rear perspective view of portions of two adjacent row units mounted on the header, with the hood that overlies the area between the adjacent row units removed.
Figure 4:
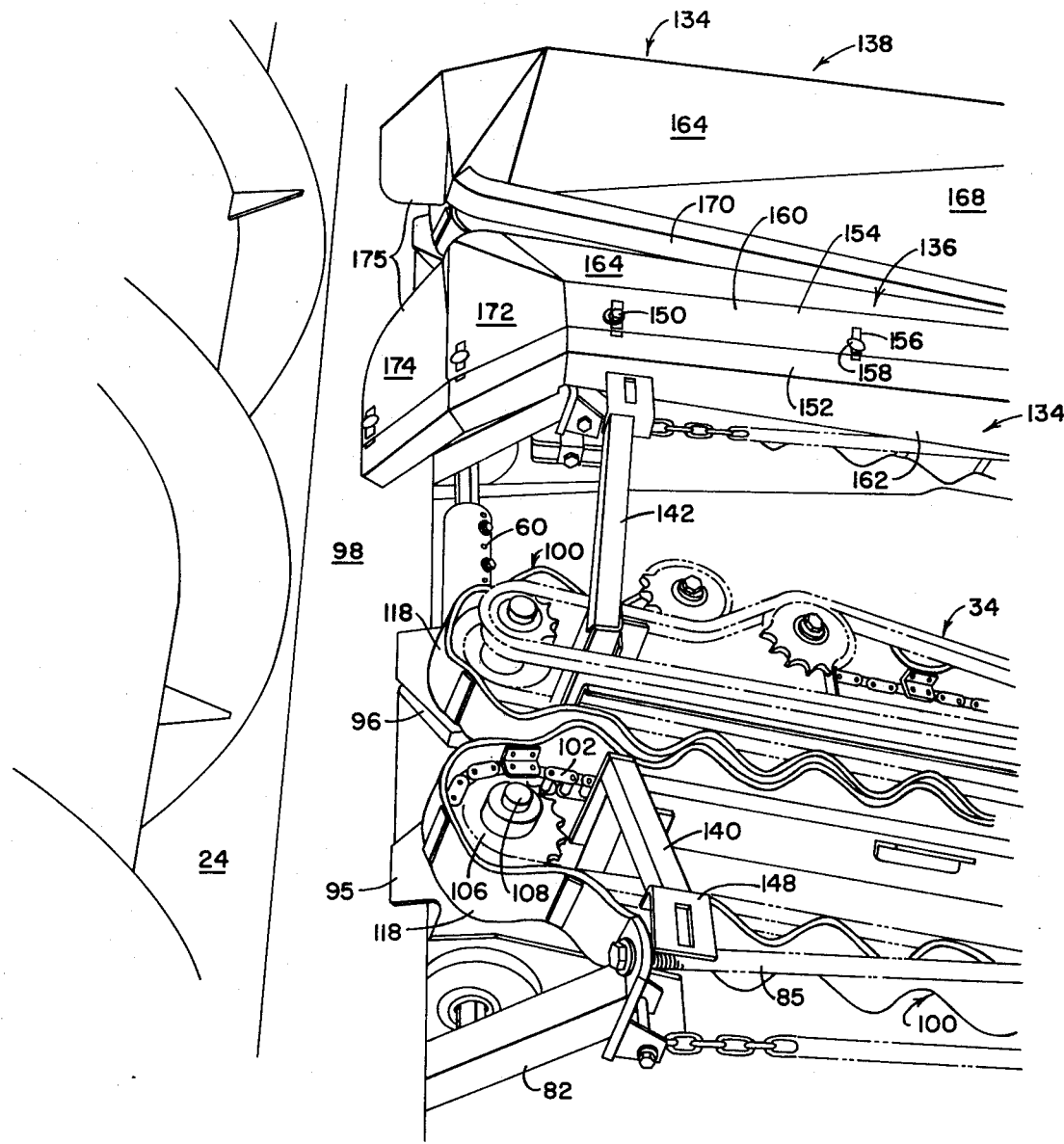
FIG. 4 is a top perspective view of the rearward portion of two row units mounted on the header, the hood portions associated with the nearest row unit being removed to disclose the rearward end of the conveyors.
Figure 5:
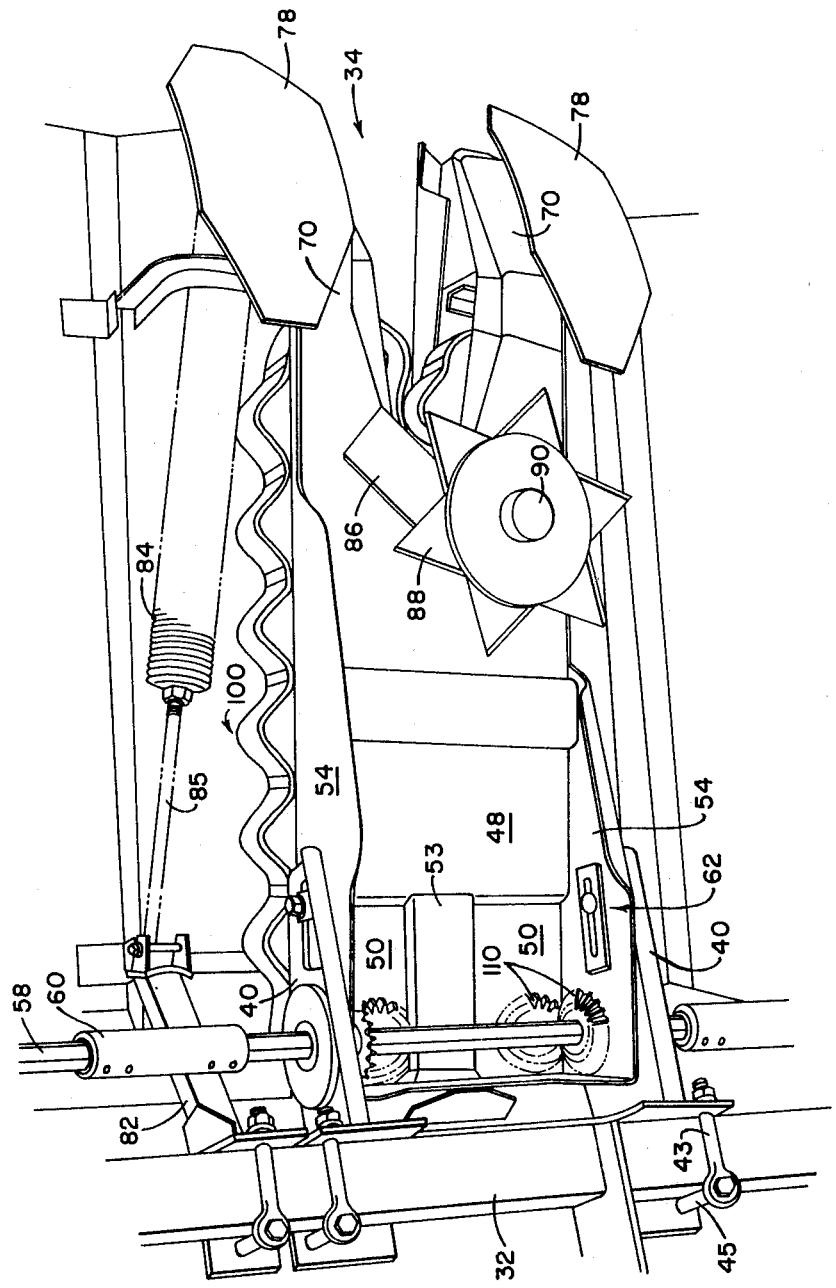
FIG. 5 is a bottom perspective view of one of the row units mounted on the header frame.
Figure 7:
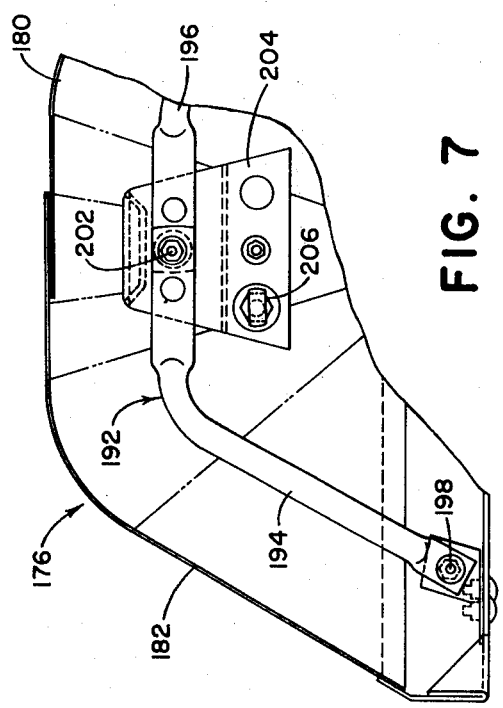
FIG. 7 is a rear view of a portion of a divider member showing the framing for mounting the divider member on the adjacent row units.

The top surface of each U-shaped member 50 is inclined upwardly and rearwardly at the same angle as the rearward portion of the frame plate 48, the top surface making approximately a 20° angle with the horizontal when the row unit frame is locked to the header frame, while approximately 8 degrees of vertical adjustment is permitted when the locking device is in an unlocked condition. As best shown in FIGS. 3 and 4, the rearward end of each top surface has an inclined portion 95 that extends downwardly generally in line with the forward portion of the floor 24, the inclination in the preferred embodiment being approximately 15°. Also, the rearward ends of the opposite inner legs 52 of the U-shaped member 50 have diverging portions 96, so that the trough 53 diverges at its rearward end. A rubber flap 98 is mounted on the underside of the rear-ward end of the trough and the rearward end of member 50 and overlies the forward edge 25 of the floor 24 to seal the space between the row units and the floor.

A pair of endless flexible conveyors 100 are respectively mounted on top of the inclined surfaces 94. The conveyors are substantially similar to the conveyors described in said U.S. Pat. No. 3,808,783, and have opposite rearwardly moving inner runs above the trough 43 and extending rearwardly from the stationary knife 86 to a rearward discharge end adjacent the diverging walls 96 of the trough. Each conveyor 100 includes a chain 102 trained around a front sprocket or pulley 104 and a rear sprocket or pulley 106. The rear sprocket is mounted on a shaft 108 that extends downwardly through the frame member 50 and is driven by the transverse shaft 58 through a bevel gear set 110, the rear sprocket 106 being the drive sprocket for the conveyor. Also attached to the shaft 108 for one of the conveyors on each row unit is a knife drive sprocket 112, which drives the rotary knife sprocket 92 by means of a chain 114 that is trained between a pair of tensioning idlers 116, also mounted on the row unit frame. The conveyors 100 include a sinuous belt 118 that is connected at intervals to the conveyor chain 102, the loops of the belts of the opposite conveyors intermeshing along the inner runs of the conveyor.

As is well known, the crop stalks are engaged at the forward end of the intermeshing conveyors and clamped therebetween, and at approximately the same time that a stalk is grasped by the belts it is severed by the cutting mechanism below the point of engagement, whereupon the conveyors move the severed stalks of crop material upwardly and rearwardly, discharging the material at the rearward end of the row unit between the auger and the floor. The downward and rearward inclination between the rearward discharge end of the conveyors and the floor prevents the loss of loose soybeans and the like from the header once the crop stalks have been discharged. As best shown in FIG. 9, the severed butt ends of the stalks, indicated by the numeral 120, move along the trough 53, and the severed stalks function as a broom to sweep the soybeans or the like upwardly and rearwardly to the auger floor. As is well known, the belt loops flatten out as they move around the rear sprockets to disengage the stalks of the crop. The rearwardly diverging walls 96 of the trough engage the butt ends of the stalks as the conveyor belt goes around the rear sprockets to aid in stripping of the crop material from the belts.

Figure 10:
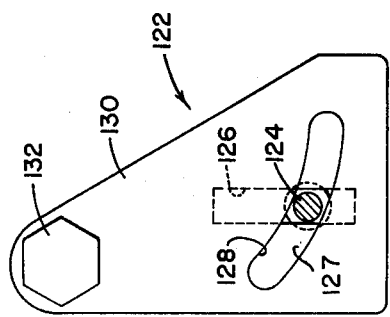
FIG. 10 is an enlarged plan view of the tension adjusting mechanism for one of the gathering elements.

The tension in the conveyor chain is adjusted by an adjusting device 122 associated with each front sprocket 104. The front sprocket 104 is mounted on a shaft 124 that extends upwardly through a fore and aft slot 126 in the top of a U-shaped bracket 127 mounted on top of the member 50 and also through an arcuate angled slot 128 in a swingable member 130 that swings about an upright pivot 132 formed by a bolt that can be selectively tightened. As is apparent from FIG. 10, where only the slot 126 of the bracket 127 is shown, when the pivot 132 is loosened to permit swinging of the member 130, the front sprocket shaft 124 can be adjusted forwardly or rearwardly along the slot 126 by simply swinging the member 130, and when the desired chain tension is achieved, the member can again be locked by tightening the pivot bolt 132.

A hood, indicated generally by the numeral 134, is mounted on and overlies the area between each pair of adjacent row units. Each hood is substantially identical, so that only one hood will be described in detail, five hoods being provided in the illustrated embodiment. Each hood 134 has a somewhat inverted U-shaped cross section and extends in a fore and aft direction, the hoods having a width that extends from the inner runs of the conveyors of one unit to the inner runs of the conveyors on the next unit and substantially overlying the entire length of the conveyors. Each hood 134 is made of two mirror image portions 136 and 138, the hood portion 136 being mounted on and vertically adjustable with one row unit, while the hood portion 138 is mounted on and vertically adjustable with the adjacent row unit. The hood portions 136 and 138 are respectively mounted on their respective row units by rear support members 140 and 142, that extend upwardly and toward one another from the adjacent row unit frames 36 immediately in front of the rear sprockets 106, while the forward ends of the hood portions are respectively supported on the adjacent row units by front support members 144 and 146, that extend upwardly from the upright members 72 on the adjacent row unit frames. Each of the supports 140, 142, 144, and 146 is provided with a slotted element that has a threaded member (not shown) mounted therein and laterally adjustable thereon, the respective hood portions being connected to the support by removable fasteners 150 extending downwardly through the hood portion and threadable into the internally threaded elements on the slotted members 148. Thus, the respective hood portions can be easily removed from the top of the row units by simply removing the fasteners 150. Each hood portion 136 and 138 is made of inner and outer telescoping sections 152 and 154 that are provided with laterally extending slots 156 and are secured together with removable fasteners 158 extending through the slots 156. By simply loosening the fasteners 158, and laterally sliding one section relative to the other, the transverse dimension or width of the hood portion can be adjusted to a limited degree to accommodate any lateral adjustment of the row units to vary the spacing between the rows.

Each hood portion 136 and 138 includes a generally horizontal, downwardly and forwardly inclined top 160, the top being formed by the inner and outer sections 152 and 154 so that the width of the top is adjustable as described above. Each hood portion has a straight fore and aft upright inner, or center wall 162 that abuts the wall 162 on the opposite hood portion, the opposite walls moving relative to one another in a vertical plane as one row unit shifts vertically relative to its adjacent row unit. The adjustment of the adjacent hood portions is best illustrated in FIG. 1, wherein the row unit B is illustrated at a higher level than the row unit A, so that the hood portion 136 attached to the row unit B is elevated relative to the hood portion attached to the row unit A, the center wall 162 of the hood portion 136 being visible.

Each hood portion 136 and 138 also includes an inclined generally triangular panel 164 and a generally triangular side panel 168 adjacent the panel 164, the side panel 168 having a generally upright side wall or edge 170 that is disposed immediately above the inner run of the conveyor 100, the side wall 170 being above and in general alignment with the side wall of the trough 53 and being spaced from the side wall of the adjacent hood by the width of the trough. Thus, the opposite side walls or edges of the hood form the upper part of a fore and aft passageway, the opposite inner runs of the conveyor 100 moving along the passageway, with the lower portion of the passageway being formed by the opposite sides of the trough 53. As best shown in FIG. 4, each hood portion also has a downwardly and rearwardly inclined rear panel 172 and a generally upright rear wall 174 immediately behind the rearward end of the adjacent conveyor 100. The outer edge 175 of the rear wall 174 helps to strip the crop material from the conveyors as the conveyor belt 118 moves around the rear sprocket.

Figure 6:
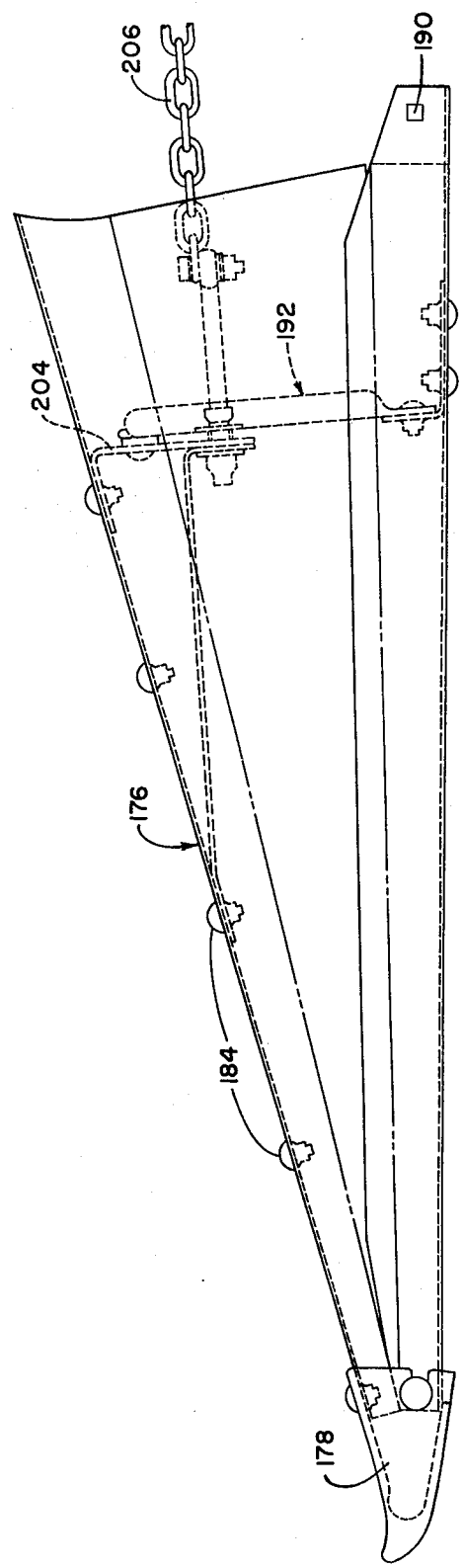
FIG. 6 is a side elevation view of one of the divider members.

Extending forwardly from each hood 134 is a forwardly converging divider member 176 that converges to a divider point 178 at its forward end, which is equidistant between the adjacent row units and moves along the ground between the adjacent rows of crop material. The divider member 176 has a generally inverted U-shaped cross section, and the rearward end of the divider members is substantially the same as and overlaps the forward end of the hood 134. The divider member 136, like the hood 134, is formed of two similar portions 180 and 182 that are fastened together at a central fore and aft seam by a number of fasteners 184 extending through transversely extending slots 186 in the top of the divider member. Again, to accommodate lateral adjustment of one row unit relative to the adjacent row unit, the fasteners 184 are loosened, to permit the amount of overlap between the divider member portions to be adjusted to vary the overall width of the divider member. Each divider member is mounted on the adjacent row units for swinging about a transverse axis at the lower rearward end of the divider member, the pivot being formed by pivot bolts 188 respectively extending through bores 190 in the lower rear end of the opposite side of the divider member and being connected to the adjacent row unit frames. Each divider also includes an inverted U-shaped support 192 that is formed by a pair of arms 194 and 196 having their lower ends respectively connected to the opposite divider member portions 180 and 182 by fore and aft pivots 198 and 200. The upper ends of the arms 194 and 196 are connected by a third fore and aft pivot 202, so that as one side of the divider member moves vertically relative to the other in response to vertical adjustment of one row unit relative to the other, the support 192 flexes about the three pivots 198, 200 and 202, while the sheet metal top portion of the divider members flexes generally along the seam between the two divider member portions. The top of the support 192 is connected to the underside of the top surface of the divider member by a bracket 204, as best seen in FIG. 6, and a generally fore and aft chain 206 interconnects the bracket 204 to an attaching element 208 carried by one of the support mast 82 for the counterbalance spring 84. As is apparent from FIG. 3, the chain 206 is disposed above and generally parallel to the row unit frames and forms a generally parallel type linkage that supports the divider member 176 in generally the same horizontal condition within the limited range of vertical swinging movement of the row unit frame. The chain, of course, collapses to permit the divider member to swing upwardly and rearwardly about the pivots 188.

As shown in FIG. 1, the hoods and the divider members extend only between the adjacent row units, and the outer side of the two outer row units are covered by end hoods 210, which, as is well known, are not as wide as the center hoods 134. The right hand row unit is shown in FIG. 3, and, as shown in the drawing, the end hood 210 has a vertical side wall 212 that forms the edge of the passageway for the end row unit. A pair of outer dividers 214 extend forwardly from the end hoods and have a lesser width than the dividers 176 so as not to interfere with the standing crop in the row outside the header.

In operation, in crops such as soybeans and the like, where it is desirable to cut the crop as close to the ground as possible, the locking devices for the individual row units are unlocked to permit the individual row units to float on the ground, the independent vertical adjustment of each row unit permitting the row unit to follow the contour of the ground. As the machine advances, the divider points 178 move between the adjacent rows and separate any tangled crop material and guide the stalks of the crop into the row unit passageways. At the forward end of each row unit the stalk of the crop is clasped between the opposite row unit conveyors and immediately upon engagement, the stalk is severed close to the ground by the rotating knife 88. The butts of the severed crop move upwardly and rearwardly along the trough 53, as previously described, sweeping any shattered beans upwardly and rearwardly along the trough to the rearward discharge end of the trough, where the beans fall onto the downwardly inclined floor and are then moved into the combine by the auger 28. Any beans shaking loose from the plants while plants are being conveyed by the conveyors fall onto the hoods 134 which deflect the loose beans down into the trough, where most of the beans are saved.

If the header is to be used in a crop such as milo or sunflowers, where it is not necessary to cut closely to the ground, the locking devices 62 can be moved to their locking condition, so that the individual row units are rigid with the header and can be supported above the ground.

We claim:

1. A row crop harvesting header for a harvesting machine adapted to advance over a field of row planted crops, comprising: a transversely elongated main frame; a plurality of transversely spaced row units extending forwardly from the main frame, each row unit including a row unit frame, means mounting the row unit frame on the main frame for independent vertical floating adjustment of the forward end of the row unit, a pair of laterally spaced elements mounted on the row unit frame and defining a generally fore and aft passageway adapted to receive a row of crop material as the machine advances, conveyor means mounted on the row unit frame and having opposite rearwardly moving inner runs on opposite sides of the passageway and operative to engage the crop material and move it rearwardly along the passageway, and cutting means mounted on the row unit frame generally below the forward end of the conveyor means for severing the crop material relatively close to the ground as the crop material moves rearwardly along the passageway; a hood means respectively mounted on each pair of adjacent row units and covering the area between the passageways of the adjacent row units, the opposite sides of each hood means at least partly forming said pair of laterally spaced elements that define the edges of the passageways, each hood means including first and second portions respectively attached to and independently vertically adjustable with the respective adjacent row units; and a forwardly converging divider member respectively mounted on each pair of adjacent row units and extending forwardly from the hood means, the forward end of each divider member moving between the adjacent rows as the machine advances.

2. The invention defined in claim 1 wherein the first and second portions of each hood means are separated from one another by a fore and aft seam that permits independent vertical adjustment of the two hood portions.

3. The invention defined in claim 1 wherein the means mounting each row unit frame on the main frame includes a locking means selectively adjustable between a float position wherein it permits limited vertical adjustment of the row unit relative to the frame and a locking position wherein it rigidly locks the row unit to the frame in a predetermined vertical position.

4. The invention defined in claim 1 wherein each divider member is mounted on the respective adjacent row units by a pair of transverse, generally aligned pivots respectively carried by the forward end of the adjacent row unit frames and a generally fore and aft, collapsible link above and generally parallel to the row unit frames, the forward end of the link being connected to the divider member above said pivots and the rearward end of the link being connected to the header frame.

5. The invention defined in claim 1 wherein the means mounting the row unit frames on the main frame include means for selectively laterally adjusting at least one of the row units on the frame to vary the spacing between adjacent row units.

6. The invention defined in claim 5 wherein each divider member includes a pair of support arms, the lower ends of which are respectively pivotally connected to the adjacent row units by fore and aft pivot means and the upper ends of which are respectively interconnected by a third fore and aft pivot means, the divider member including a sheet metal outer surface that is connected to the support arms and flexes as one row unit moves vertically relative to the adjacent unit, the pivotally interconnected support arms articulating about said pivots during said vertical adjustment.

7. The invention defined in claim 1 wherein each row unit frame has a relatively flat downwardly and forwardly inclined upper surface with a central fore and aft trough defining the bottom of said passageway, the cutting means being mounted on the frame below said surface at the forward end of the trough and the conveyor means being disposed immediately above said surface and spaced a short distance above the bottom of the trough, so that the severed butt ends of the crop material move rearwardly in said trough.

8. The invention defined in claim 7 wherein the header includes a transversely elongated floor having a forward end adjacent and below the level of the rearward discharge end of the conveyor means, and including a downwardly and rearwardly inclined flexible flap means spanning the gap between the rearward ends of the row unit upper surfaces and the forward end of the floor.

9. The invention defined in claim 1 wherein each row unit includes at least one generally fore and aft pivot means mounted on the forward end of the row unit frame and a skid rockably mounted on the pivot means and adapted to ride along the ground to support at least part of the weight of the forward end of the row unit, the skid oscillating about the axis of the pivot means to follow the contour of the ground.

10. The invention defined in claim 1 wherein each conveyor means includes front and rear pulley means respectively mounted on the row unit frame adjacent the forward and rearward ends of the passageway and an endless flexible conveyor member trained around the pulley means, each conveyor member including a plurality of outwardly extending projections that intermesh with the projection on the opposite conveyor member along the inner runs of the conveyor means to grasp the crop material therebetween.

11. The invention defined in claim 10 and including drive means operatively associated with each rear pulley means for driving the flexible conveyor member and means for adjustably mounting the front pulley means on the row unit frame for selective adjustment in a fore and aft direction to adjust the tension in the conveyor member, said adjusting means including a generally vertical shaft carrying the pulley means and extending through a generally fore and aft first slot in the frame, a laterally adjustable member and an angled second slot in the laterally adjustable member, so that lateral shifting of the adjustable member causes the pulley shaft to move in a fore and aft direction along the first slot.

12. The invention defined in claim 10 where each hood means includes a generally upright rear wall extending between the rearward ends of the passages of the adjacent row units immediately to the rear of the conveyor members, the rear walls having generally upright edges at its opposite side respectively adjacent to the rearward end of the conveyor member that strip crop material from the conveyor members as the conveyor members move around the respective rear pulley means.

13. A row crop harvesting header for a harvesting machine adapted to advance over a field of row planted crops, comprising: a transversely elongated main frame; a plurality of transversely spaced row units extending forwardly from the main frame, each row unit including a row unit frame, pivot means carried by the main frame and swingably mounting the row unit frame on the main frame for independent vertical floating adjustment of the forward end of the row unit about the pivot means, a pair of laterally spaced elements mounted on the row unit frame and forming a generally fore and aft passageway adapted to receive a row of crop material as the machine advances, a conveyor means mounted on the row unit frame and having opposite rearwardly moving inner runs on opposite sides of the passageway and operative to engage the crop material and move it rearwardly along the passageway, and cutting means mounted on the row unit frame generally below the forward end of the conveyor means for severing the crop material relatively close to the ground as the crop material moves rearwardly along the passageway; a locking means operative between each row unit and the header frame and shiftable between a float position wherein it permits limited vertical floating adjustment of the row unit about said pivot means and a locking position wherein it rigidly locks the row unit to the frame in a predetermined position; and hood means respectively mounted on each pair of adjacent row units and covering the area between the passageways of the adjacent row units, the opposite sides of each hood means at least partly forming said laterally spaced elements that define the edges of the adjacent passageways.

14. The invention defined in claim 13 wherein each hood means includes first and second portions, respectively attached to and independently vertically adjustable with the respective adjacent row units, and a forwardly converging divider member mounted on each pair of adjacent row units and extending forwardly from the hood means, the forward end of each divider member moving between the adjacent rows as the machine advances.

15. The invention defined in claim 14 wherein each divider member is mounted on the respective adjacent row units by a pair of transverse, generally aligned pivots respectively carried by the forward end of the adjacent row unit frames and a generally fore and aft collapsible link above and generally parallel to the row unit frames, the forward end of the link being connected to the divider member above said pivots and the rearward end of the link being connected to the header frame.

16. The invention defined in claim 14 wherein each divider member includes a pair of support arm, the lower end of which are respectively pivotally connected to the opposite sides of the divider member by fore and aft pivot means and the upper ends of which are respectively interconnected by a third fore and aft pivot means, the divider member including a sheet metal outer surface that is connected to the support arms and flexes as one row unit moves vertically relative to the adjacent unit, the pivotally interconnected support arms articulating about said pivots during said vertical adjustment.

17. The invention defined in claim 13 wherein each row unit includes a pair of fore and aft arms rigidly attached to and extending forwardly from the header frame and respectively including fore and aft slots and each row unit frame includes opposite upright side walls respectively adjacent to the pair of arms and having generally fore and aft slots, and the locking means comprises a pair of locking elements respectively shiftable in a fore and aft direction in the slots in the side walls of the row unit frame and simultaneously engageable with the opposite sides of the fore and aft slots in the arms to lock the row unit frame to the arms in the locking position of the locking element and shiftable along the arm slots to an enlarged slot area wider than the locking element to permit the row unit frame to swing about the pivot means until the locking element engages the top or the bottom of the enlarged portion of the slot.

18. The invention defined in claim 13 wherein each conveyor means includes an endless flexible conveyor member trained around front and rear pulley means respectively mounted on the row unit frame adjacent the forward and rearward ends of the passageway, each conveyor member including a plurality of outwardly extending projections that intermesh with the projection on the opposite conveyor member along the inner runs of the conveyor means to grasp the crop material therebetween.

19. The invention defined in claim 18 wherein each row unit frame includes a relatively flat downwardly and forwardly inclined upper portion adjacent to and immediately below the flexible conveyor members and a central fore and aft trough below the opposite inner runs of the conveyor members, the cutting means being mounted on the frame below said inclined upper portion at the forward end of the trough and the bottom of the conveyor members being spaced a short distance above the bottom of the trough, so that the severed butts of the crop material move rearwardly in said trough.

20. A row crop harvesting header for a harvesting machine adapted to advance over a field of row planted crops, comprising: a transversely elongated header frame; a plurality of transversely spaced row units extending forwardly from the header frame, each row unit including a downwardly and forwardly inclined frame having a relatively flat downwardly and forwardly inclined upper portion with a central fore and aft trough having a bottom generally parallel to and below said upper portion, a cutting means mounted on the row unit frame generally below the forward end of the trough for severing the crop material relatively close to the ground, and a pair of conveyor means mounted on the row unit frame above the trough, each conveyor means including front and rear pulley means mounted on the frame and an endless flexible conveyor member respectively trained around the front and rear pulley means, the conveyor members being disposed above and adjacent to said upper surface and including opposite inner runs disposed above the trough and spaced from the trough bottom the conveyor members being adapted to engage the crop material between the opposite inner runs as it is being severed by the cutting means and move the severed crop material rearwardly, the butt ends of the severed crop material moving rearwardly in the trough.

21. The invention defined in claim 20 wherein the trough has opposite side walls that are generally parallel throughout the substantial length of the trough and diverge rearwardly at the rear end of the trough adjacent the rear conveyor pulley means, the diverging side walls of the trough stripping crop material from the conveyor members as the conveyor members move about the rear pulley means.

22. The invention defined in claim 20 and including a hood means respectively mounted on each pair of adjacent row units and covering the area between the row units, the opposite sides of the hood means being disposed generally above the inner sides of the respective troughs on the adjacent row units and being disposed generally above the inner runs of the conveyor means, the sides of the trough and the opposite sides of the adjacent hood means forming fore and aft passageways adapted to receive the crop material as the machine advances.

23. The invention defined in claim 22 wherein each hood means includes a generally upright rear wall immediately to the rear of the inner conveyor members of the adjacent row units, the opposite edges of the rear wall being disposed adjacent to the respective conveyor members to strip the crop material as the conveyor members move about the rear pulley means.

24. The invention defined in claim 20 and including a pivot means operatively mounting each row unit on the header frame for independent vertical floating adjustment of the forward end of the row unit about the pivot means and spring means operative between the row unit and the header frame for partly counterbalancing the weight of the row unit.

25. The invention defined in claim 24 and including locking means operative between each row unit and the header frame and selectively adjustable between a float position, wherein it permits limited vertical adjustment of the row units relative to the frame, and a locking position wherein it rigidly locks the row unit to the frame in a predetermined vertical position.

26. A row crop harvesting header for a harvesting machine adapted to advance over a field of row planted crops, comprising: a transversely elongated header frame; a plurality of transversely spaced row units extending forwardly from the frame, each row unit including a downwardly and forwardly inclined frame, means mounting the row unit frame on the header frame for independent vertical floating adjustment of the forward end of the row unit frame relative to the header frame, a pair of laterally spaced elements mounted on the row unit frame and forming a generally fore and aft passageway adapted to receive a row of crop material as the machine advances, a conveyor means mounted on the row unit frame and adapted to engage the crop material and move it rearwardly along the passage, a cutting means mounted on the row unit frame and operative to sever the crop material moving rearwardly along the passageway relatively close to the ground, at least one generally fore and aft pivot means mounted on a lower forward portion of the row unit frame, and a skid rockably mounted on the fore and aft pivot means and adapted to ride along the ground to support the forward end of the row unit, the skid oscillating about the axis of the pivot means to follow the contour of the ground.

27. The invention defined in claim 26 wherein the means mounting the row unit frame on the header frame includes means for selectively laterally adjusting at least one of the row units on the frame to vary the spacing between adjacent row units.

28. The invention defined in claim 26 and including a hood means respectively mounted on each pair of adjacent row units and covering the area between the passageways of the adjacent row units, the opposite sides of each hood means at least partially forming said laterally spaced elements that define the edges of the passageways, each hood means including first and second portions respectively attached to and independently vertically adjustable with the respective adjacent row unit frames.

29. The invention defined in claim 26 wherein the means mounting each row unit frame on the header frame includes a locking means selectively adjustable between a float position, wherein it permits said independent vertical adjustment of the row unit relative to the frame, and a locking position, wherein it rigidly locks the row unit to the frame in a predetermined vertical position.

30. A row crop harvesting header for a harvesting machine adapted to advance over a field of row crop planted crops comprising: a transversely elongated header frame; and a plurality of transversely spaced row units mounted on and extending forwardly from the header frame, each row unit including a forwardly and downwardly inclined frame, a pair of laterally spaced elements mounted on the row unit frame and forming a generally fore and aft passageway adapted to receive a row of crop material as the machine advances, and a pair of endless flexible conveyor means mounted on the row unit frame, having opposite rearwardly moving inner runs on opposite sides of the passageway and operative to engage the crop material and move it rearwardly along the passageway, each conveyor means including front and rear pulley means respectively mounted on front and rear portions of the row unit frame, an endless flexible conveyor member trained around the front and rear pulley means, and means for adjustably mounting each front pulley means on the row unit frame for selective adjustment in a fore and aft direction to adjust the tension in the conveyor member, said adjusting means including a generally fore and aft slot in the row unit frame and a laterally adjustable member having an angled slot, and a shaft carrying the pulley means and extending through said slots, whereby lateral shifting of the adjustable member causes the pulley shaft to move in a fore and aft direction along the slot in the frame.

31. The invention defined in claim 30 wherein each row unit includes a rotary cutting means generally below the forward end of the conveyor means for severing the crop material relatively close to the ground as the crop material moves rearwardly along the passageway, the cutting means including a generally upright shaft journaled in the row unit frame and drive means drivingly connecting the upper end of the shaft to one of the rear pulley means of the conveyor means above the conveyor member.

32. A row crop harvesting header for a harvesting machine adapted to advance over a field of row planted crops comprising: a transversely elongated header frame; a plurality of transversely spaced row units extending forwardly from the frame, each row unit including a frame mounted on and extending forwardly from the header frame, a pair of laterally spaced members mounted on the row unit frame and forming a generally fore and aft passageway adapted to receive a row of crop material as the machine advances, a pair of endless flexible conveyor means mounted on the row unit frame on opposite sides of the passageway and having opposite rearwardly moving inner runs along opposite sides of the passageway operative to engage the crop material and move it rearwardly along the passageway, each conveyor means including front and rear pulley means respectively mounted on front and rear portions of the row unit frame, drive means for driving the rear pulley means, and an endless flexible conveyor member trained around the front and rear pulley means, and rotary cutting means mounted on the row unit frame generally below the forward end of the passageway for severing the crop material relatively close to the ground as the crop material is engaged by the conveyor means, the cutting means including a rotary cutting element disposed on the underside of the row unit frame and mounted on a shaft journaled in and extending upwardly through the frame, and drive means operatively connecting the shaft to the rear pulley means of one of the conveyor means for rotating the cutting element, the drive means including a drive sprocket coaxially connected to and disposed above the rear pulley means, a driven sprocket attached to the cutting element shaft and a drive chain disposed above the conveyor member.

33. The invention defined in claim 32 and including removable fastener means at the upper end of the cutting element shaft that is selectively removable to permit the shaft to drop from the row unit frame.

34. The invention defined in claim 32 and including a hood means respectively mounted on each pair of adjacent row units, and covering the area between the passageways of the adjacent row units, each hood means at least partially overlying the conveyor means and the drive means for the cutting means for one of the row units.

35. A row crop harvesting header for a harvesting machine adapted to advance over a field of row planted crops comprising: a transversely elongated header frame; a transversely elongated floor having a forward end; a transverse auger means mounted on the header frame immediately above the floor, the front side of the auger means being generally above the forward end of the floor; a plurality of transversely spaced row units mounted on and extending forwardly from the header frame, each row unit including a frame connected to the header frame and having a relatively flat downwardly and forwardly inclined upper surface with a rearward end closely adjacent and slightly above the forward end of the floor, a pair of laterally spaced elements on the frame and at least partially forming a generally fore and aft passageway adapted to receive a row of crop material as the machine advances, a pair of endless flexible conveyor means mounted on the row unit frame and having opposite rearwardly moving inner runs at opposite sides of the passageway and operative to engage the crop material and move it rearwardly along the passageway, each conveyor means including a front and a rear pulley means respectively journaled on the row unit frame and an endless flexible conveyor member trained around the front and rear pulley means, the lower edge of the conveyor member being disposed immediately above the upper surface of the frame and the rearward discharge end of the conveyor member being disposed immediately above the rearward end of the upper surface immediately in front of and above the forward end of the floor forwardly of the front side of the auger, and cutting means mounted on the row unit frame generally below the forward end of the conveyor means for severing the crop material relatively close to the ground as the crop material moves rearwardly along the passageway; and a hood means respectively mounted on each pair of adjacent row units and covering the area between the passageways of the adjacent row units, the opposite sides of each hood means at least partly forming said laterally spaced elements that define the edges of the passageway.

36. The invention described in claim 35 wherein each hood means includes a generally upright rear wall extending between the rearward ends of the passages of the adjacent row units immediately to the rear of the conveyor members, the rear walls having generally upright edges at its opposite side respectively adjacent to the rearward end of the conveyor member to strip crop material from the conveyor members as they move around the respective rear pulley means.

37. The invention defined in claim 35 wherein each row unit frame includes a central fore and aft trough at least partly defining the bottom of said passageway, the cutting means being mounted on the frame below the bottom of the trough and the conveyor means being spaced a short distance above the bottom of the trough so that the severed butts of the crop material move rearwardly in said trough.

38. A row crop harvesting header for a harvesting machine adapted to advance over a field of row planted crops, comprising: a transversely elongated header frame; a plurality of transversely spaced row units pivotally mounted on and extending forwardly from the frame for independent vertical adjustment thereto, each row unit including a forwardly and downwardly inclined frame having its rearward end pivotally mounted on the header frame and its forward end disposed adjacent to the ground, a pair of laterally spaced elements on the frame at least partially forming a generally fore and aft passageway adapted to receive a row of crop material as the machine advances, conveyor means mounted on the frame and operative to engage crop material and move it rearwardly along the passageway; a hood means respectively mounted on each pair of adjacent row units and covering the area between the passageways of the adjacent row units, the opposite sides of each hood means at least partly forming said laterally spaced elements that define the edges of the passageway; a pair of transverse generally aligned pivots respectively carried by the forward ends of adjacent row unit frames; a forwardly converging divider member respectively mounted on each pair of adjacent row units and extending forwardly from the hood means, the forward end of each divider member moving between adjacent rows as the machine advances, the bottom of each divider member being mounted on the transverse pivot means; and a generally fore and aft flexible link above and generally parallel to the row unit frame connecting the divider member above the pivot means to the header frame the row unit frame and the flexible link partly forming a parallelogram type linkage connecting the divider member to the header frame so that the divider member maintains a substantially constant attitude regardless of the height of the header.

* * * * *